July 26, 1960     B. BARÉNYI     2,946,624
TRANSPARENT PLASTIC CAR TOP
Filed March 28, 1955
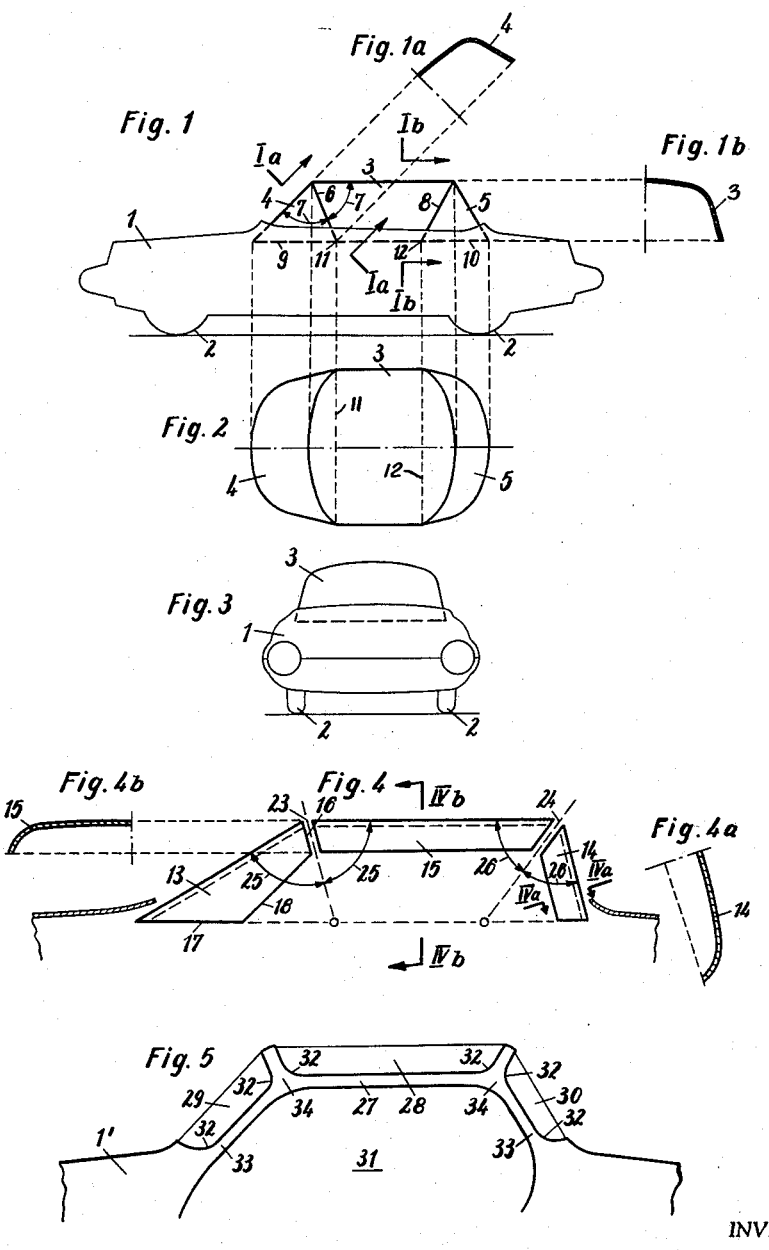
INVENTOR
*BÉLA BARÉNYI*
BY *Dicke and Craig*
ATTORNEYS

United States Patent Office 2,946,624
Patented July 26, 1960

2,946,624

TRANSPARENT PLASTIC CAR TOP

Béla Barényi, Stuttgart-Hohenheim, Germany, assignor to Daimler-Benz Aktiengesellschaft, Stuttgart-Unterturkheim, Germany Filed Mar. 28, 1955, Ser. No. 497,255

3 Claims. (Cl. 296—137)

The present invention relates to passenger cars, and it is its principal object to provide a car body, the central passenger compartment of which is enclosed by a hood which principally consists of plastic material.

A further object of the invention is to devise such a middle part of the car body of a design and shape which may be made more easily and less expensively than previous constructions by composing the same in a simple manner of plastic material.

Still another object of the invention is to provide a car roof having a visibility superior to prior designs.

An essential feature of the invention resides in making the plastic elements, which are preferably transparent and are combined so as to form the middle part of the car body, of wall or window portions, each of which is either curved only about a single axis or about several parallel axes disposed at one side of the plastic elements, and thus curving in only one direction, the curvature of the roof portion thus being equal to that of the front or rear window. Such curvatures of the roof and window parts include a curvature of each of these parts which as viewed from the side of the car constitutes the outer profile or outer contour of each such part as it is seen in this view.

Making the different elements of such equal curvature produces the advantage that their connecting edges will accurately coincide and result in joints which may be easily and securely sealed, provided the joint between the roof and each of the respective adjoining walls lies within a transverse plane of the car, which coincides with the angle bisector between the roof part and the respective end wall of the middle section, and intersects at right angle with the central vertical plane extending in the longitudinal direction of the car.

Further objects, features, and advantages of the present invention will be apparent from the following detailed descrpition thereof and the accompanying drawings, in which:

Fig. 1 shows a side view of a passenger car with a middle part of its body designed according to the invention;

Fig. 1a shows a partial cross section through the front window of the middle part, taken along line Ia—Ia of Fig. 1;

Fig. 1b shows a partial cross section through the roof of the middle part taken along line Ib—Ib of Fig. 1;

Fig. 2 is a plan view of the middle part of the car as shown in Fig. 1;

Fig. 3 is a front view of the car;

Fig. 4 is a side view of the middle part of a car body according to a modification of the invention;

Fig. 4a is a partial cross section through the rear window of the middle part of a car body taken along line IVa—IVa of Fig. 4;

Figure 4b is a partial cross section through the roof of the middle part of a car body taken along line IVb—IVb of Figure 4; while Fig. 5 is a side view of another modification of the invention of the middle part of a car body.

Referring to the drawings, the passenger car as shown in Figs. 1 to 3 consists of a car body 1 which may be, for example, of the self-supporting type and may enclose the usual axle assembly with front and rear wheels 2. The car body 1 comprises a middle part covering the passenger compartment like a hood and composed of several sections of a transparent plastic, one forming the roof 3, while the two others form the front window 4 and the rear window 5.

As shown particularly in Figs. 1a and 1b, the roof 3 of the middle part including both front and rear windows 4 and 5 are made of wall or window parts which are curved only about axes which are parallel to each other and are thus curving in only one direction. Also, the profile of the curvature of the roof 3 is equal to that of the front window 4 as well as the rear window 5.

As shown in Fig. 1, a joint 6 between the roof 3 and the front window 4 is so inclined that, when seen in a side view, it forms equal angles 7 to the two adjacent outer edges of these parts. The joint 6 thus lies within such transverse plane which coincides with the angle bisector between the roof 3 and the front window 4 of the middle part, and intersects at right angle with the central vertical plane extending in the longitudinal direction of the car. In different words, the transverse plane just referred to bisects the angle formed by the outer contours of the front window part and the roof part previously referred to. The joint 8 between the roof 3 and the rear window 5 is disposed in a similar manner.

Fig. 1 also shows that the upper edge of the front window 4 forming the joint 6, as well as the lower edge 9 thereof, each lie within a plane, the plane of the upper edge extending from the highest point within the central vertical plane in the longitudianl direction of the car in a downwardly inclined direction toward the central transverse plane of the car, and the plane of the lower edge 9 extending horizontally and intersecting with the lower edge 10 of the rear window 5 which is otherwise of similar shape. Thus, the plane within which the points of intersection between the front window 4 and the roof 3 lie and the plane within which the lower edges of the front window 3 lie, intersect at point 11 in Figure 1, forming a straight line of intersection in the plan view of Figure 2. The condition is similar in the case of the rear window 5 where the two respective planes intersect at point 12 in Figure 1 forming a straight line of intersection 12 in Figure 2.

In the second embodiment of the invention shown in Fig. 4, the front and rear windows 13 and 14 only take up a part of the middle part of the car body. The lateral ends of the upper edge 16 and the lower edge 17 of, for example, the front window 13 are connected on each side of the car by lateral edges 18 of the window, although the front and rear windows 13 and 14 of this embodiment of the invention are of quite different inclination, the joints 23 and 24 between the roof 15 and the two windows 13 or 14, respectively, still are so inclined that, when seen in a side view as shown in Fig. 4, they form equal angles 25 and 26, respectively, relative to the two adjacent outer edges of the parts 13, 14, and 15.

As illustrated in Figs. 4a and 4b, the curved profiles of the roof 15 and the rear wall 14, are equal to each other as well as to the profile of the front wall 13.

According to the third modification of the invention as shown in Fig. 5, the middle part of the car body consists of a framework 27 which forms a part of the main body 1' and extends along the joints between the transparent roof 28, transparent front and rear windows 29 and 30, and cutouts 31 for the doors (not shown) on both sides of the car. As clearly shown in Fig. 5, the transparent parts are rounded off along their corners so as to form wider and stronger connecting and intersecting portions 33 and 34 of the framework to reinforce the entire structure. The curvature of the transparent sections 28, 29, and 30 otherwise corresponds to that of the first two embodiments of the invention as described above.

While I have described my invention with reference to the preferred embodiments thereof I wish to have it understood that it is in no way limited to the details of such embodiments or to the specific examples described, but is capable of numerous modifications within the scope of the appended claims.

What I claim is:

1. A passenger car comprising a car body having a passenger compartment therein and a middle part substantially enclosing said passenger compartment like a hood, said middle part substantially consisting of a transparent plastic material, and composed of a roof part, a front window part and a rear window part, each said part having a shape conforming to cyclindrical curvatures, the axes of said cylindrical curvatures being parallel, the cylindrical curvatures of said roof part being equal in degree to the cylindrical curvatures of said front window part and of said rear window part, each of said parts having an outer contour as viewed from the side of said car, said contour being constituted by one of said cylindrical curvatures, the said outer contours of said front window part and said rear window part forming angles respectively with the outer contour of said roof part, a first joint between said roof part and said front window part, said joint being disposed along a curved line lying in a first plane transverse to said car body, one of said angles being bisected by a line lying in said plane, a second joint between said roof part and said rear window part, said second joint being disposed along a curved line lying in a second plane transverse to said car body, and the other of said angles being bisected by a line lying in said second plane.

2. A passenger car as defined in claim 1, wherein said front window part and said rear window part have lower edges lying in a common horizontal plane.

3. A passenger car as defined in claim 2, wherein said first joint and said second joint intersect said horizontal plane.

References Cited in the file of this patent

UNITED STATES PATENTS

| | | |
|---|---|---|
| D. 164,149 | Allen | Aug. 7, 1951 |
| 1,264,804 | Jacobs | Apr. 30, 1918 |
| 2,373,214 | Wolkenhauer | Apr. 10, 1945 |
| 2,639,938 | Pickard | May 26, 1953 |
| 2,747,923 | MacLean | May 29, 1956 |

FOREIGN PATENTS

| | | |
|---|---|---|
| 1,059,116 | France | Nov. 10, 1953 |
| 963,078 | France | June 28, 1950 |
| 680,389 | Great Britain | Oct. 1, 1952 |

OTHER REFERENCES

"Automotive Industries," Aug. 1, 1953, page 149.
"Automotive Industries," Aug. 15, 1939, page 185.
"Ford Field," September 1946, page 39.
"Automobile Engineer," April, 1954, pages 147–149.